United States Patent [19]

Fukuda et al.

[11] Patent Number: 5,030,080
[45] Date of Patent: Jul. 9, 1991

[54] RESIN MATERIAL SUPPLY APPARATUS TO RESIN PRESS MOLDING MACHINE

[75] Inventors: Yoshihiro Fukuda, Kamakura; Hiroaki Kondo, Kobe; Tsutomu Sano, Toyonaka; Kazuyuki Kajiyama, Akashi; Naoki Takeuchi, Kobe, all of Japan

[73] Assignee: Kabushiki Kaisha Kobe Seiko Sho, Kobe, Japan

[21] Appl. No.: 545,117

[22] Filed: Jun. 26, 1990

Related U.S. Application Data

[63] Continuation of Ser. No. 335,939, Apr. 10, 1989, abandoned.

[30] Foreign Application Priority Data

Apr. 11, 1988 [JP] Japan .............................. 63-48930[U]
Mar. 6, 1989 [JP] Japan ................................. 1-25944[U]

[51] Int. Cl.$^5$ ............................................. B29C 45/00
[52] U.S. Cl. ..................................... 425/148; 425/171; 425/203; 425/256; 425/561; 425/562; 425/575; 425/587
[58] Field of Search ................ 264/40.4; 425/145, 148, 425/150, 171, 203, 256, 469, 544, 561, 562, 575, 585, 586, 587, DIG. 228

[56] References Cited

U.S. PATENT DOCUMENTS

| | | | |
|---|---|---|---|
| 2,760,232 | 8/1956 | Rougemont et al. | 425/148 |
| 2,822,577 | 2/1958 | Schieser et al. | 425/148 |
| 3,264,688 | 8/1966 | McIlvin | 425/587 |
| 3,278,992 | 10/1966 | Strauss | 425/544 |
| 3,481,001 | 12/1969 | Stillhard | 425/203 |
| 3,674,401 | 7/1972 | Annis, Jr. et al. | 425/587 |
| 3,891,372 | 6/1975 | Takiura | 425/587 |
| 3,963,558 | 6/1976 | Skidmore | 425/203 |
| 4,036,405 | 7/1977 | Mombaecher | 222/63 |
| 4,060,226 | 11/1977 | Schweller | 425/203 |
| 4,134,714 | 1/1979 | Driskill | 425/203 |
| 4,600,375 | 7/1986 | Honsho et al. | 425/585 |
| 4,752,201 | 6/1988 | Kauffman et al. | 425/561 |
| 4,792,424 | 12/1988 | Loman | 425/203 |

FOREIGN PATENT DOCUMENTS

| | | | |
|---|---|---|---|
| 78926 | 5/1983 | European Pat. Off. | 425/574 |
| 2020054 | 11/1971 | Fed. Rep. of Germany . | |
| 48-100461 | 12/1973 | Japan . | |
| 56-129151 | 10/1981 | Japan . | |
| 57-87340 | 5/1982 | Japan | 425/561 |
| 60-46223 | 3/1985 | Japan . | |

Primary Examiner—Jay H. Woo
Assistant Examiner—C. Scott Bushey
Attorney, Agent, or Firm—Oblon, Spivak, McClelland Maier & Neustadt

[57] ABSTRACT

An apparatus for supplying a resin material to molds of a resin press molding machine includes a supply cylinder for supplying the resin material to the molds, resin material charge hopper mounted to the supply cylinder, a plunger for extruding the resin material within the supply cylinder, a drive device for moving forward and backward the plunger in an axial direction, an opening and closing device for opening and closing an opening of a fore end of the supply cylinder, and a die positioned between the opening and closing device and the molds to form the resin material into a predetermined shape.

3 Claims, 6 Drawing Sheets

RESIN MATERIAL SUPPLY APPARATUS TO RESIN PRESS MOLDING MACHINE

This application is a continuation of application Ser. No. 7/335,939, filed on Apr. 10, 1989, now abandoned.

BACKGROUND OF THE INVENTION

1. Field of the Invention

The present invention relates to a resin material supply apparatus to a resin press molding machine.

2. Description of the Prior Art

Figure 7:
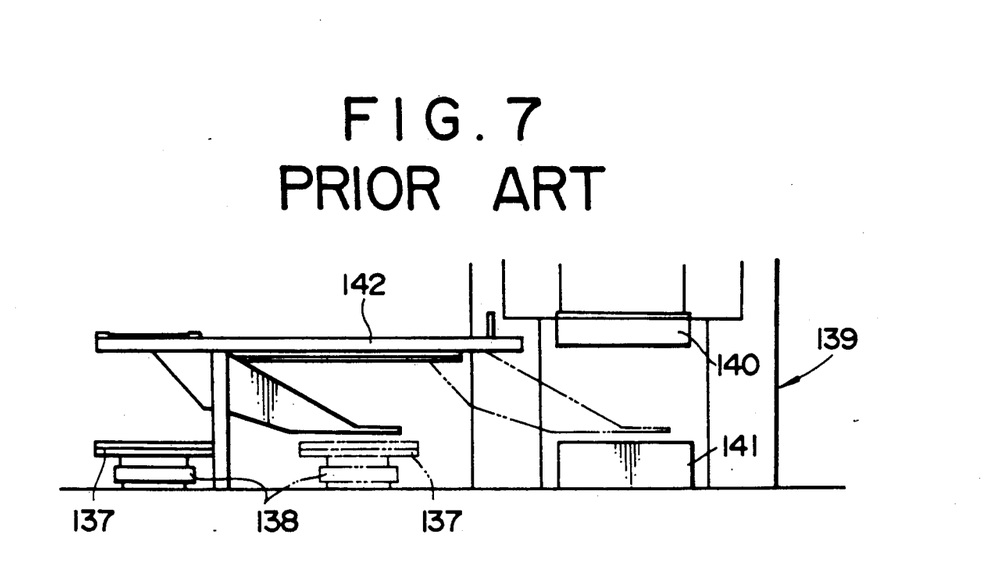
FIG. 7 is an explanatory view showing an example of prior art.
Figure 8:
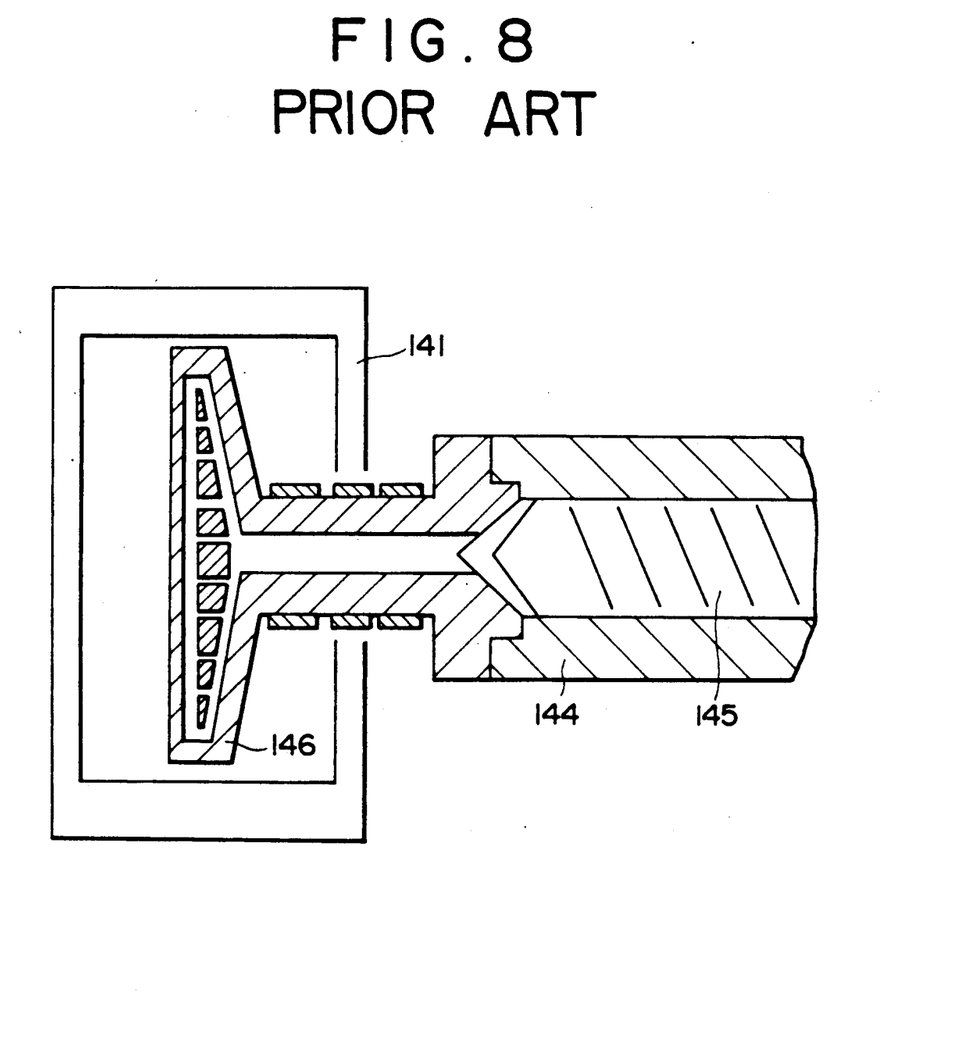
FIG. 8 is a plan sectional view showing a further example of prior art.

Examples of apparatus for supplying a resin material to a mold of a resin press molding machine are shown in FIGS. 7 and 8.

In the FIG. 7 apparatus, a sheet-like resin material 137 is cut, and the thus cut resin materials are manually stacked on a carriage 138 while being adjusted to a shape (a molding pattern) of molds 140 and 141 of a resin press molding machine 139, the thus stacked resin materials 137 being supplied by means of a charging device 142 onto the mold 141 in a manner such that the shape thereof is not altered.

Alternatively, in the FIG. 8 apparatus, a resin material is extruded into a predetermined shape by means of a screw 145 provided within a supply cylinder 144 through a die 146 and then supplied onto the mold 141.

The FIG. 7 apparatus has a problem in that since the manually accomplished step is involved, the resin material supply work to the molds 140 and 141 cannot be performed in an automatic fashion.

There is a further problem in that air enters between the stacked resin materials 137 and cannot be removed, and therefore a surface of a molded product molded by the resin press molding machine 139 is inferior.

The FIG. 8 apparatus is free from the problems as noted above but has the following problem in the case the resin material contains glass fibers.

That is, in the apparatus shown in FIG. 8, the resin material is extruded by the screw 145 to cause it to pass through the die 146. Therefore, it is necessary to make the screw 145 to be of a shallow groove type so that high pressure is applied to the resin material by the screw 145.

Therefore, if the resin material contains the glass fibers, when the resin material passes through the supply cylinder 144, the glass fibers are sometimes broken to deteriorate the strength of the molded product.

Particularly, in the case where the FIG. 8 apparatus makes use of an injection unit, the resin material also passes through a back-flow check valve, and therefore the above-described problem becomes marked.

SUMMARY OF THE INVENTION

It is an object of the present invention to provide a resin material supply apparatus to a resin press molding machine which can solve the aforementioned problems.

For solving the aforementioned problem, the means employed by the present invention provides an apparatus for supplying a resin material 8 of molds 2, 4 to a resin press molding machine 1, comprises a supply cylinder 13 for supplying the resin material 8 to the molds 2, 4, resin material supply means 14 connected to the supply cylinder 13, a plunger 15 for extruding the resin material 8 within the supply cylinder 13, a drive device 16 for moving forward and backward the plunger 15 in an axial direction, an opening and closing device 17 for opening and closing an opening of a fore end of the supply cylinder 13, and a die 18 positioned between the opening and closing device 17 and the molds 2, 4 to form the resin material into a predetermined shape.

Furthermore, the resin material supply means 14 comprises a charge hopper 22 into which the resin material 8 is charged, a charge screw 24 by which the resin material 8 within the charge hopper 22 is charged into the supply cylinder 13, a rotational drive device 25 for the charge screw 24, and a shutter device 27 for opening and closing a supply opening of the charge hopper 22 to the supply cylinder 13.

The resin material supply means 14 comprises a charge hopper 22a provided on the side of the supply cylinder 13, a cartridge container 40 into which the resin material 8 is put and placed on the charge hopper 22a, a charge cylinder device 42 having a piston 41 adapted to charge the resin material 8 within the cartridge container 40 into said supply cylinder 13, and a shutter device 27 for opening and closing a supply opening of the charge hopper 22a to the supply cylinder 13.

The apparatus is further provided with a weighing device 19 for detecting a backward position of the plunger 15 to detect that a predetermined quantity of the resin material 8 has been charged into the supply cylinder 13.

Moreover, the supply cylinder 13, the resin material supply means 14, the plunger 15, the drive device 16 for the plunger 15, the opening and closing device 17 and the die 18 are provided on a carriage 9, and the apparatus is provided with a drive device 11 for moving the carriage 9 in a pair of cross horizontal directions.

When the resin material supply means 14 supplies the resin material 8 to the molds 2 and 4 of the resin press molding machine 1 provided with the charge screw 24 or the like, the shutter device 27 is opened and the opening and closing device 17 is closed, in which state, the charge screw 24 is driven by the drive device 25 of the resin material supply means 14 to charge the resin material 8 within the charge hopper 22 into the supply cylinder 13.

At the time of this charging, the plunger 15 is moved backward, but when the plunger 15 is moved backward through a predetermined amount and a predetermined quantity of the resin material 8 having a predetermined weight, is charged into the supply cylinder 13, the weighing device 19 detects this.

When a predetermined quantity of the resin material 8 is charged into the supply cylinder 13, an electric motor 25 for the resin material supply means 14 is stopped to stop a supply of the resin material 8 into the supply cylinder 13.

Thereafter, the shutter device 27 is closed and the opening and closing device 17 is opened. The plunger 15 is moved forward by the drive device 16 so that the resin material 8 within the supply cylinder 13 is extruded into a predetermined shape passing through the opening and closing device 17 and the die 18 and then supplied into the molds 2 and 4.

At the time of supply, the carriage 9 is moved in a pair of cross horizontal directions by means of the drive device 11, whereby the resin material 8 can be supplied to suitable places of the molds 2 and 4.

In the case where the resin material supply means 14 is composed of a charge cylinder device 42, a cartridge container 40 and so forth, the container 40 is placed on the charge hopper 22a and in the state wherein the shutter device 27 is closed, the charge cylinder 42 is actuated so that the resin material 8 within the cartridge container 40 is compressed by the piston 41 to deair the resin material 8 and render the density of the resin material constant. Then, the shutter device 27 is opened, and the resin material 8 is extruded into the supply cylinder 13 by the piston 41 to charge a predetermined quantity of the resin material 8 into the supply cylinder 13.

BRIEF DESCRIPTION OF THE DRAWINGS

FIGS. 2 to 4 show a second embodiment according to the present invention, FIG. 2 being a front view partly in section, FIG. 3 being a side view;

DETAILED DESCRIPTION OF THE PREFERRED EMBODIMENTS

Figure 1:
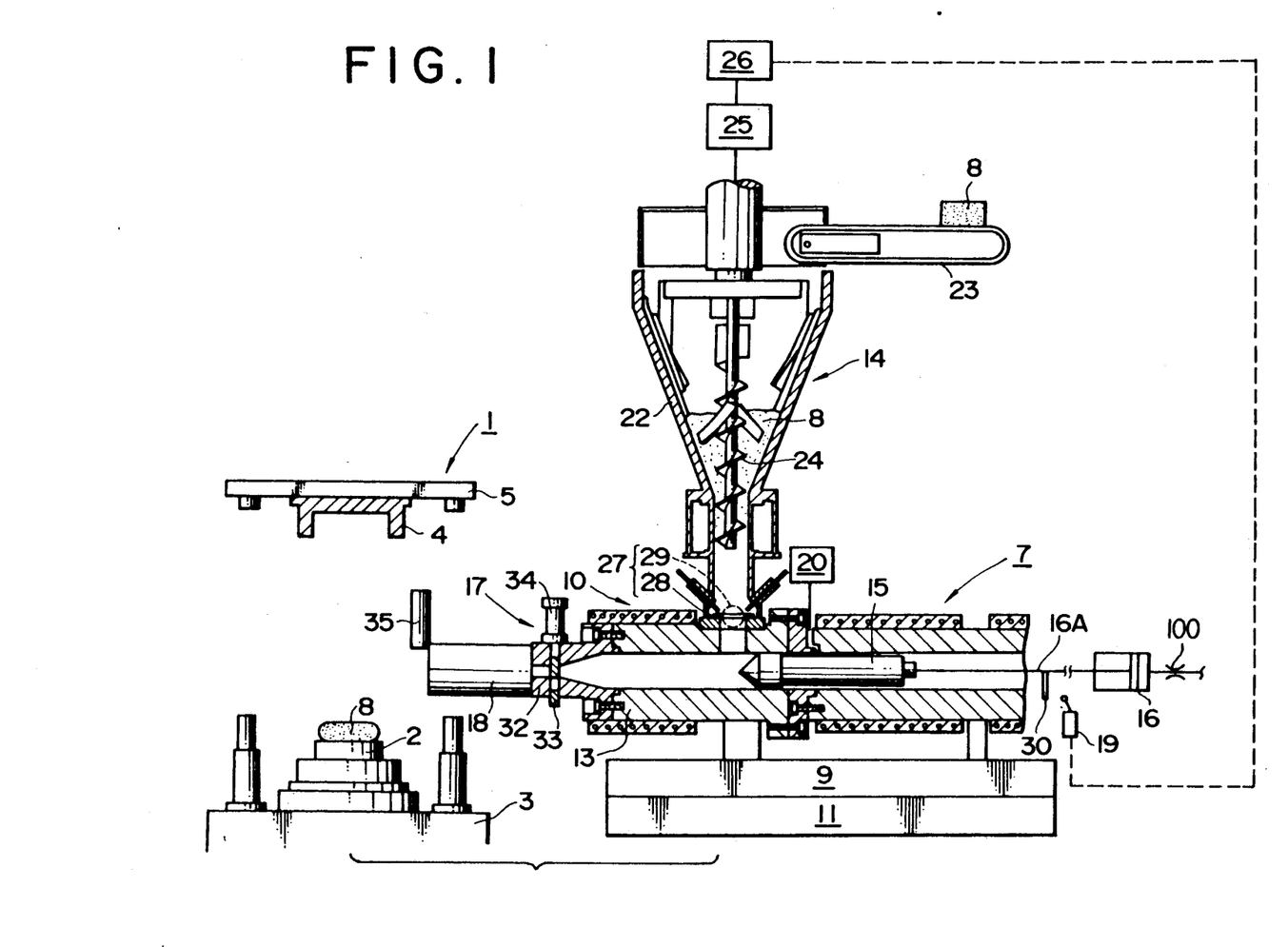
FIG. 1 is a front sectional view showing a first embodiment according to the present invention.

The first embodiment of the present invention will be described with reference to FIG. 1. A resin press molding machine indicated at 1 comprises a fixed plate 3 on which is fixedly mounted a lower mold 2, and a movable plate 5 on which is fixedly mounted an upper mold 4, the movable plate 5 being movable forward and backward with respect to the fixed plate 3.

A resin material supply device indicated at 7, which is disposed sideway of the molds 2 and 4 of the resin press molding machine 1, supplies the resin material 8 to the molds 2 and 4.

The resin material supply device 7 generally comprises a carriage 9, an apparatus body 10 disposed on the carriage 9, and a drive device 11 for moving the carriage 9 and the apparatus body 10 in two transverse horizontal directions and in the vertical direction.

The drive device 11 may be composed, for example, of a rail, an electric motor, a hydraulic cylinder and so forth.

The apparatus body 10 comprises a supply cylinder 13, a resin material supply means 14 feeding into the supply cylinder 13, a plunger 15 for extruding the resin material 8 within the supply cylinder 13, an extruding hydraulic cylinder 16 in the form of a drive device for moving forward and backward the plunger 15 in an axial direction, an opening and closing device 17 for opening and closing an opening of a fore end of the supply cylinder 13, a die 18 positioned between the opening and closing device 17 and the molds 2, 4 to form the resin material 8 into a predetermined shape, and a weighing device 19.

The supply cylinder 13 is disposed horizontally laterally of the molds 2 and 4, and the resin material 8 is supplied thereinto from the resin material supply means 14.

The supply cylinder 13 is provided with a vent device 20 for deairing the front portion of the supply cylinder 13.

The resin material supply means 14 comprises a charge hopper 22 mounted upright on the supply cylinder 13, a conveyor 23 for supplying the resin material 8 into the hopper 22, a charge screw 24 for charging the resin material 8 within the hopper 22 into the supply cylinder 13, an electric motor 25 in the form of a rotational drive device for driving the screw 24, a control device 26 for controlling the electric motor 25 to drive, stop and control rotational frequency of the motor.

On the lower end of the hopper 22 is provided a shutter device 27 for opening and closing a resin material supply opening to the supply cylinder 13. The shutter device 27 comprises a valve body 28 for opening and closing the supply opening and an opening and closing hydraulic cylinder 29 for moving the valve body 28, the hydraulic cylinder 29 being disposed horizontally and crossing with the supply cylinder 13.

The screw 24 is merely provided to charge the resin material 8 into the supply cylinder 13 and it is not necessary to put high pressure on the resin material 8. Therefore, the screw 24 is of a deep groove gentle compression type so that even if the resin material 8 contains glass fibers, the glass fiber is not broken by the screw 24.

The plunger 15 is provided within the supply cylinder 13 so that the former is movable in an axial direction, and is operatively connected to a piston rod 16A of the extruding hydraulic cylinder 16.

The weighing device 19 is provided to detect the backward position of the plunger 15 to meter a predetermined weight or quantity of the resin material 8 has been charged into the front portion of the supply cylinder 13. In the illustrated embodiment, for example, a limit switch is used, which is actuated by an actuator 30 fixedly mounted on the piston rod 16A. When the actuator 30 is detected by the weighing device 19, the electric motor 25 for the resin material supply means 14 is stopped, for example by supplying a signal from the weighing device to the motor control 26.

The opening and closing device 17 is provided at the end of the supply cylinder 13, and comprises a tubular body 32 fixedly mounted on the supply cylinder 13, a valve body 33 for opening and closing the interior of the tubular body 32, and an opening and closing hydraulic cylinder 34 for moving the valve body 33.

The die 18 is provided at the fore end of the opening and closing device 17 to shape the resin material 8 extruded from the supply cylinder 13 and the opening and closing device 17 into a predetermined shape. A guide for the resin material 8 is sometimes provided between the die 18 and the molds 2, 4.

A cutter 35 for cutting the extruded resin material 8 is provided at the fore end of the die 18.

According to the first embodiment constructed as described above, when the glass fiber contained thermosetting resin material 8 is to be supplied into the molds 2 and 4 of the resin press molding machine 1, first, the shutter device 27 at the lower end of the hopper 22 is closed, in which state, the resin material 8 is supplied by the conveyor 23 into the hopper 22.

Next, the shutter device 27 at the lower end of the hopper 22 is opened and the opening and closing device 17 is closed, in which state the screw 24 is rotated and driven by the electric motor 25 to charge the resin material 8 within the hopper 22 into the front portion of the supply cylinder 13.

During this charge, the plunger 15 is moved backward while contracting the extruding hydraulic cylinder 16. It is to be noted that in this case, the extruding hydraulic cylinder 16 does not move freely but a drain oil from the extruding hydraulic cylinder 16 is caused to pass through a throttle valve 100 to apply back pressure to the plunger 15.

Thereby, a suitable resistance can be applied to a supply of the resin material 8 into the supply cylinder 13 by way of the screw 24, and at the time of said supply by way of the screw 24, the resin material 8 can be deaired.

In the above-described case, if the front portion of the supply cylinder 13 is deaired by the vent device 20, it is possible to perform deairing of the resin material 8 in a more satisfactory manner.

When the extruding hydraulic cylinder 16 is contracted by the supply of the resin material 8 into the rear portion of the supply cylinder 13 and a predetermined quantity of the resin material 8 is supplied into the front portion of the supply cylinder 13, the weighing device 19 is actuated by the actuator 30, and the electric motor 25 for the resin material supply means 14 is stopped to stop a supply of the resin material 8 into the supply cylinder 13.

In this manner, a predetermined quantity of the resin material 8 is accurately charged into the supply cylinder 13. Since the back pressure is applied to the plunger 15, the plunger 15 accurately moves according to the charged quantity of the resin material, and therefore, a predetermined quantity of the resin material 8 is more accurately charged. Moreover, since this quantity is compacted and deaired, it will have a pretermined weight.

After a predetermined quantity of the resin material 8 has been charged into the supply cylinder 13, the shutter device 27 at the lower end of the hopper 22 is closed and the opening and closing device 17 is opened.

In this state, the plunger 15 is moved forward by the extruding hydraulic cylinder 16 to supply the resin material 8 within the supply cylinder 13 while extruding it into a predetermined shape through the opening and closing device 17 and the die 18, to the molds 2 and 4.

At the time of this supply, the apparatus body 10 can be moved by the drive device 11 in a pair of cross horizontal directions (and vertical direction as needed) and thereby the resin material 8 can be supplied to suitable portions of the molds 2 and 4.

Further, at the time of this supply, the resin material 8 is merely extruded by the plunger 15, and therefore, even if the resin material 8 contains the glass fibers, the glass fibers are not broken.

When the plunger 15 assumes the foremost advanced position to complete a supply of the resin material 8 to the molds 2 and 4, the cutter 35 at the fore end of the die 18 is actuated to cut the end of the extruded resin material 8.

Figure 2:
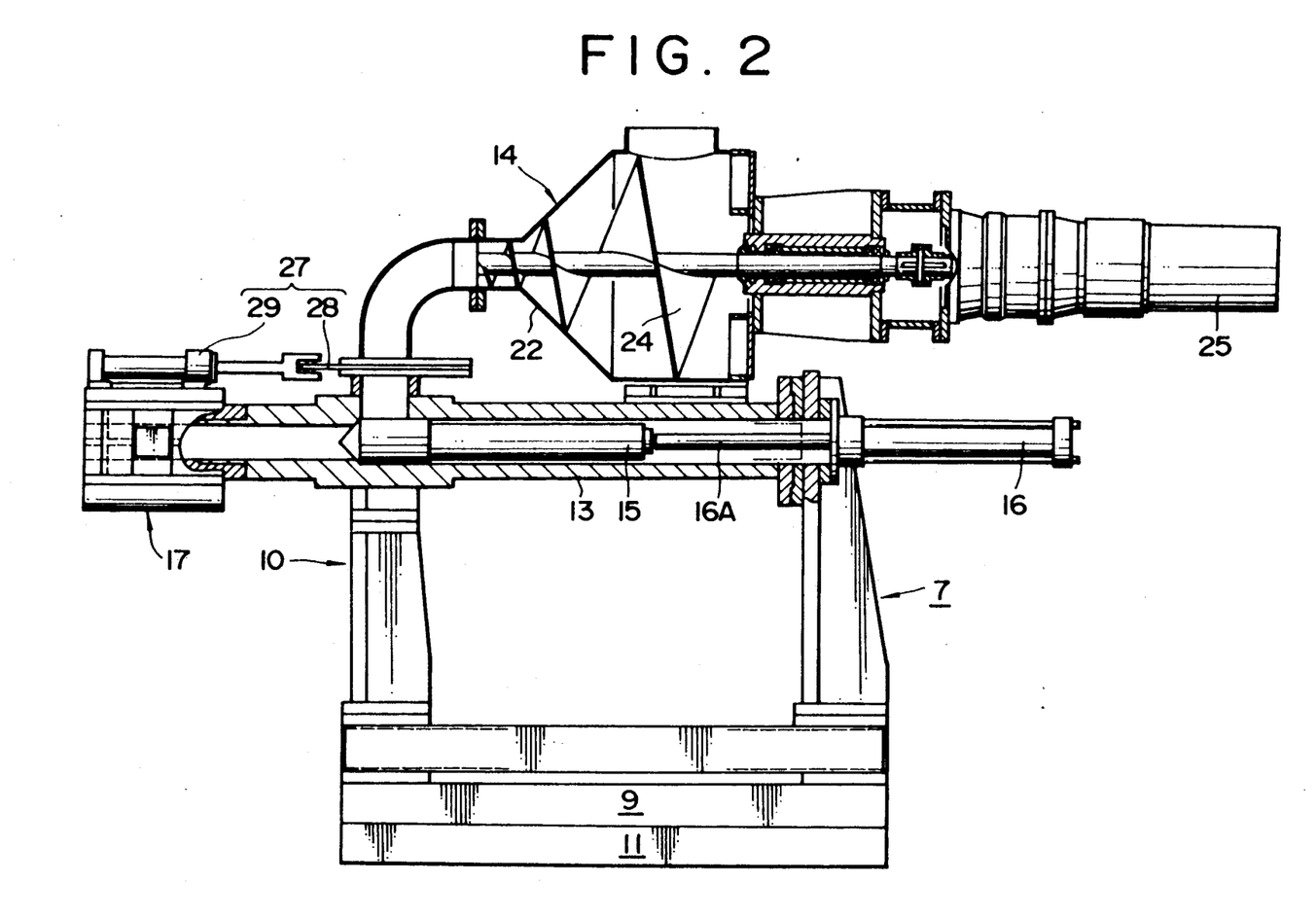
Figure 3:
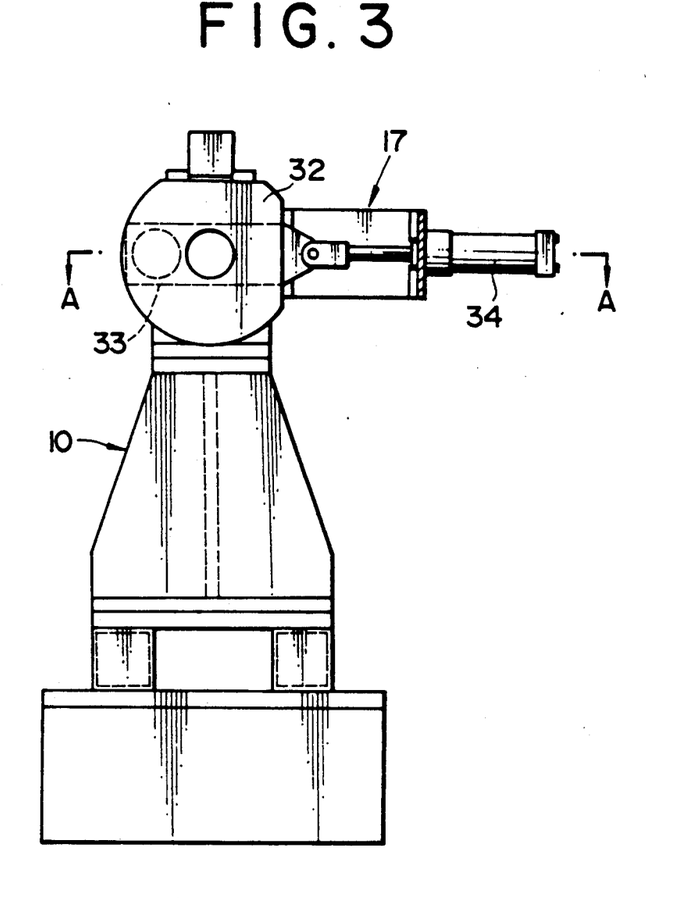
Figure 4:
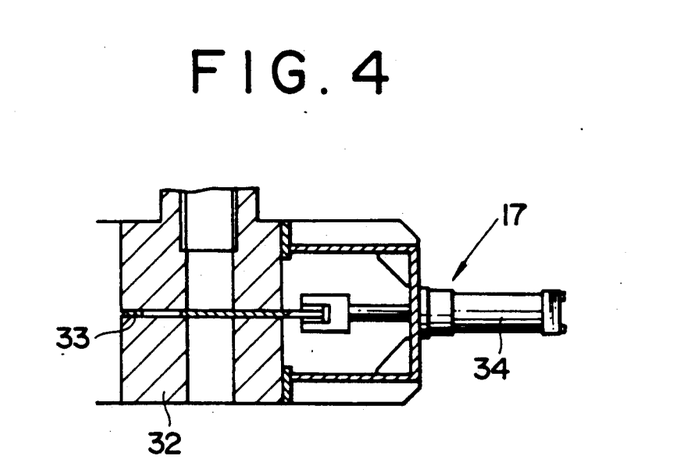
FIG. 4 is a sectional view taken on line A—A of FIG. 3.

FIGS. 2 to 4 show the second embodiment according to the present invention, in which the hopper 22 of the resin material supply means 14 and the screw 24 are of the lateral type.

The opening and closing hydraulic cylinder 29 of the shutter device 27 is provided on the tubular body 32 of the opening and closing device 17 and is parallel with the supply cylinder 13.

The opening and closing hydraulic cylinder 34 of the opening and closing device 17 is disposed horizontally and is projected sideways of the tubular body 32.

Figure 5:
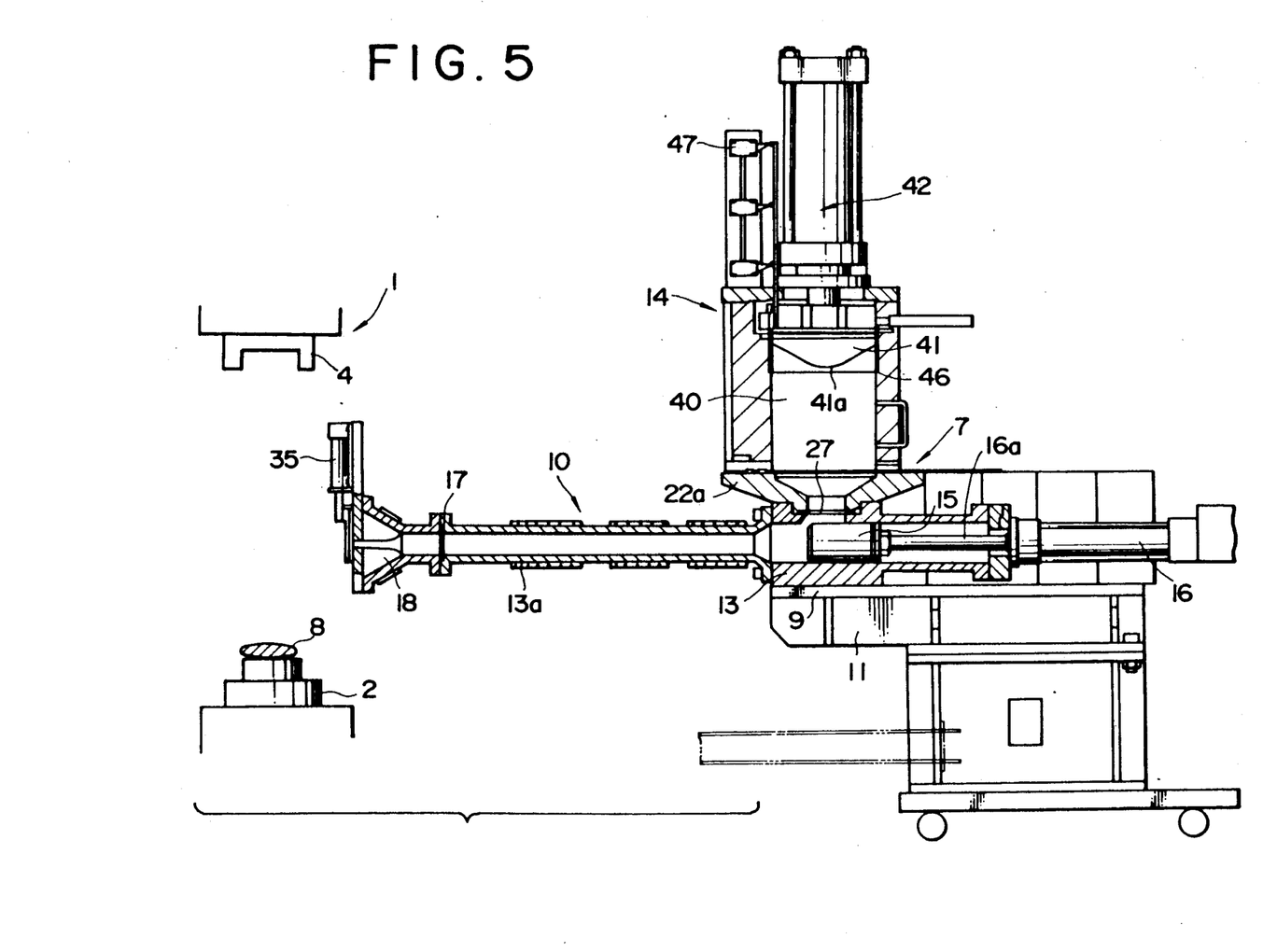
FIGS. 5 and 6 show a third embodiment according to the present invention, FIG. 5 being a front sectional view, FIG. 6 being a sectional view of essential parts.
Figure 6:
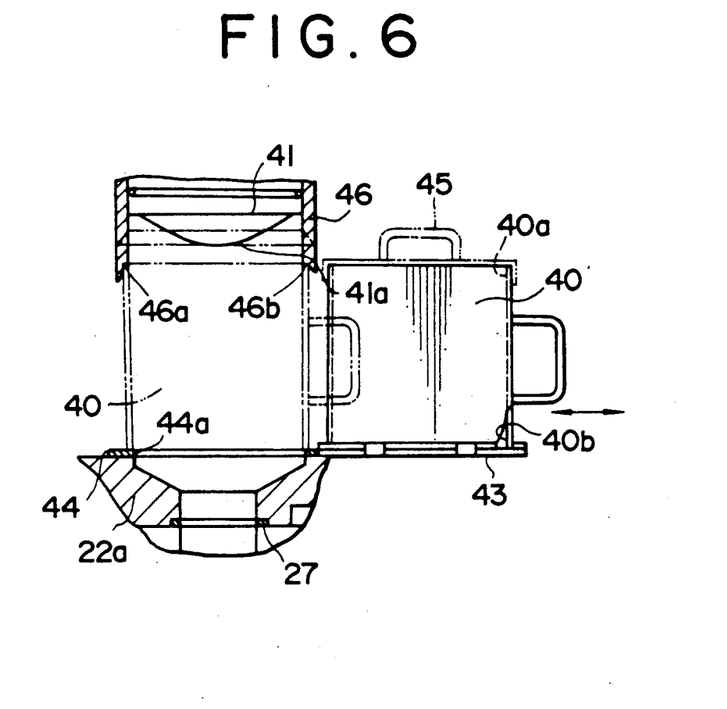

FIGS. 5 and 6 show the third embodiment according to the present invention, in which an adapter 13a is interposed between the supply cylinder 13 and the die 18, and the opening and closing device 17 is provided at the fore end of the adapter 13a.

The aforesaid resin material supply means 14 comprises a charge hopper 22a mounted upright on the supply cylinder 13, a cartridge container 40 into which resin material 8 is put and which is exchangeably placed on the hopper 22a, a charge cylinder device 42 having a piston 41 for charging the resin material 8 within the cartridge container 40 into the supply cylinder 13, and said shutter device 27.

As shown in FIG. 6, the cartridge container 40 is in the form of a cylinder having upper and lower openings 40a and 40b, the lower opening 40b being closed by means of a slidably open- and closeable lower lid 43. This container 40 is carried to a predetermined position of the charge hopper 22a by means of a conveyor device not shown, for example, and is urged toward the charge hopper 22a by the transporting means for exchanging a cartridge container. At that time, the upper surface of a plate 44 provided on the upper surface of the hopper 22a is set to the same level as the lower surface of the cartridge container 40, and the lower lid 43 comes into contact with the plate 44 and only the container 40 rides on the plate 44. After the resin material 8 within the cartridge container 40 has been charged into the supply cylinder 13 through the opening 44a of the plate 44, the empty cartridge container 40 is replaced with a container 40 with the resin material 8 contained therein successively transported by the transporting means.

It is to be noted that the upper opening 40a of the container 40 is closed by the upper lid 45, and when the container 40 is placed on the hopper 22a, the upper lid 45 may be automatically removed.

A cylindrical fixing member 46 serving as a positioning means is positioned upwardly of the cartridge container 40 placed on the hopper 22a, the fixing member being movable up and down. The fixing member 46 is formed in its lower peripheral edge with a tapered guide surface 46a and a fixed portion 46b. The fixing member 46 finely adjusts the container 40 on the hopper 22a to a predetermined position and thereafter presses and fixes it from the top. The inside diameter of the fixing member 46 is the same as the inside diameter of the container 40.

The charge cylinder device 42 is positioned upwardly of the fixing member 46 and is provided vertically coaxial with the fixing member 46.

A piston 41 is mounted at the lower end of the cylinder rod 42a of the cylinder device 42, the piston 41 being vertically slidably provided along the inner peripheral surface of the fixing member 46 and the container 40. The lower surface 41a of the piston 41 is formed into a convex surface corresponding to the inner surface shape of the hopper 22a. Accordingly, when the piston 41 moved down, the lower surface 41a comes into contact or close to the inner surface of the hopper 22a, and therefore, almost all of the resin material 8 can be extruded toward the supply cylinder 13 without being left in the hopper 22a. Reference numeral 47 denotes a plurality of limit switches which perform vertical positioning of the piston 41.

With the above-described arrangement, in charging the resin material 8 within the cartridge container 40 into the supply cylinder 13, the container 40 is placed on the charge hopper 22a and the shutter device 27 is closed, in which state the charge cylinder device 42 is actuated so that the resin material 8 within the cartridge container 40 is compressed by the piston 41 to deair the resin material 8 to render the density of the resin material 8 constant. Next, the shutter device 27 is opened so that the resin material 8 is extruded into the supply cylinder 13 by the piston 41 and a predetermined quantity of the resin material 8 having a constant density is charged into the supply cylinder 13.

Accordingly, if pressure and speed of the plunger 15 at the time of extrusion are controlled, a predetermined quantity of resin material 8 having a constant density can be extruded by the plunger 15, and therefore, a predetermined quantity of the resin material 8 can be accurately supplied to the molds 2 and 4.

When the resin material is supplied to the molds of the resin press molding machine, it is not necessary to carry out the manual operation such that the resin material is stacked on the carriage as shown in FIG. 7 and the unmanned automatic supply can be made. In addition, the surface shape of the molded product is not deteriorated by air between the stacked resin materials.

Furthermore, since the resin material within the supply cylinder is extruded by the plunger to cause it to pass through the die, even if the resin material contains glass fibers, the glass fiber is not broken.

In charging the resin material into the supply cylinder by the screw, if back pressure is applied to the plunger, the resin material can be deaired, and the surface state of the molded product can be further improved.

In this case, if back pressure applied to the plunger is adequately set, it is not necessary to apply such high pressure to the resin material by the screw. The screw can be made of the deep groove and gentle compression type. Even if the resin material contains glass fibers, the glass fibers are not possibly broken by the screw.

Since the resin material within the cartridge container is extruded into the supply cylinder by the piston of the charge cylinder device, even if the resin material contains glass fibers, it is possible to effectively prevent the glass fibers from being broken. Furthermore, when the resin material within the container is compressed with the shutter device closed, the resin material can be deaired, the density of the material can be made constant, and the resin material having a constant density can be charged into the supply cylinder.

A predetermined quantity of resin material can be accurately charged into the supply cylinder.

The resin material can be supplied to suitable places of the molds of the resin press molding machine.

What is claimed is:

1. An apparatus for supplying resin material to molds, comprising:
    a mold supply cylinder having a discharge end;
    a plunger movable in said supply cylinder away from and toward said discharge end for respectively filling said supply cylinder and extruding resin from said supply cylinder to a mold;
    resin supply means connected to said supply cylinder at a position along the length thereof for supplying resin to said supply cylinder;
    plunger drive means for moving said plunger in said supply cylinder;
    a die positioned at said one end between said supply cylinder and a mold for shaping resin extruded from said supply cylinder;
    vent means connected to said supply cylinder at a position such that a connection of said resin supply means with said supply cylinder is between said discharge end and a connection of said vent means with said supply cylinder for degassing the resin therein;
    a carriage supporting said supply cylinder for moving said supply cylinder in two transverse horizontal directions;
    an opening and closing device positioned between said supply cylinder and said die for selectively stopping the extrusion of resin from said supply cylinder; and
    weighing means for metering a quantity of resin to be extruded from said supply cylinder to a mold, comprising:
    a) means for resisting movement of said plunger away from said discharge end, whereby said plunger is moved by pressure of resin being supplied to said supply cylinder, so that a position of said plunger corresponds to a quantity of resin in said supply cylinder, and
    b) means for detecting movement of said plunger away from said discharge end and to a position corresponding to a desired quantity of resin being metered to said supply cylinder.

2. The apparatus of claim 1 wherein said resin supply means comprises:
    a charge hopper mounted to said supply cylinder;
    a charge screw extending in said charge hopper and rotatable for advancing resin material in said charge hopper towards said supply cylinder; and
    charge screw rotating means.

3. An apparatus for supplying resin material to molds, comprising:
    a mold supply cylinder having a discharge end;
    a plunger movable in said supply cylinder away from and toward said discharge end for respectively filling said supply cylinder and extruding resin from said supply cylinder to a mold;
    resin supply means connected to said supply cylinder at a position along the length thereof for supplying resin to said supply cylinder;
    plunger drive means for moving said plunger in said supply cylinder;
    a die positioned at said one end between said supply cylinder and a mold for shaping resin extruded from said supply cylinder;
    vent means connected to said supply cylinder at a position such that a connection of said resin supply means with said supply cylinder is between said discharge end and a connection of said vent means with said supply cylinder for degassing the resin therein;
    a carriage supporting said supply cylinder for moving said supply cylinder in two transverse horizontal directions;
    weighing means for metering a quantity of resing to be extruded from said supply cylinder to a mold, comprising:
    a) means for resisting movement of said plunger away from said discharge end, whereby said plunger is moved by pressure of resin being supplied to said supply cylinder, so that a position of said plunger corresponds to a quantity of resin in said supply cylinder, and
    b) means for detecting movement of said plunger away from said discharge end and to a position corresponding to a desired quantity of resin being metered to said supply cylinder.

* * * * *